United States Patent
Okawara

(10) Patent No.: US 8,045,045 B2
(45) Date of Patent: *Oct. 25, 2011

(54) IMAGE PICKUP APPARATUS, CONTROL METHOD FOR THE SAME, AND PROGRAM FOR IMPLEMENTING THE CONTROL METHOD

(75) Inventor: Hiroto Okawara, Ibaraki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/502,544

(22) Filed: Jul. 14, 2009

(65) Prior Publication Data

US 2009/0273702 A1    Nov. 5, 2009

Related U.S. Application Data

(63) Continuation of application No. 10/803,637, filed on Mar. 18, 2004, now Pat. No. 7,576,793.

(30) Foreign Application Priority Data

Mar. 20, 2003   (JP) ................................. 2003-078440

(51) Int. Cl.
   *H04N 5/232* (2006.01)
(52) U.S. Cl. ........ 348/347; 348/262; 348/263; 348/264; 348/208.11; 348/208.12; 348/345; 396/76; 396/77; 396/82; 396/131
(58) Field of Classification Search .......... 348/262–264, 348/347, 208.11, 208.12, 345; 396/76–83, 396/131
See application file for complete search history.

(56) References Cited

U.S. PATENT DOCUMENTS

| | | | |
|---|---|---|---|
| 4,473,743 A | | 9/1984 | Ishikawa |
| 5,278,601 A | | 1/1994 | Kawanami |
| 5,296,970 A | | 3/1994 | Morizumi |
| 5,298,933 A | | 3/1994 | Chigira |
| 5,315,340 A | * | 5/1994 | Hirasawa .................... 396/81 |
| 5,402,175 A | * | 3/1995 | Tanaka ...................... 348/351 |
| 5,757,429 A | * | 5/1998 | Haruki ....................... 348/354 |
| 5,771,410 A | | 6/1998 | Sato et al. |
| 5,832,318 A | | 11/1998 | Sato et al. |
| 6,055,378 A | | 4/2000 | Oono et al. |
| 6,603,929 B2 | | 8/2003 | Ishikawa et al. |

(Continued)

FOREIGN PATENT DOCUMENTS

| | | |
|---|---|---|
| JP | 3-36511 A | 2/1991 |
| JP | 4-145420 A | 5/1992 |
| JP | 10-10405 A | 1/1998 |
| JP | 11-352384 A | 12/1999 |
| JP | 2003-15016 A | 1/2003 |

*Primary Examiner* — Nicholas Giles
*Assistant Examiner* — Usman Khan
(74) *Attorney, Agent, or Firm* — Rossi, Kimms & McDowell LLP

(57) ABSTRACT

An image pickup apparatus which is capable of optimizing the responsiveness of linear changes in focus to operations of a ring member without sacrificing the operability of the ring member, while using a small-sized, low-cost ring member for manual operations. The rotating operation state of a focus ring 600 is detected by ring rotation sensors 603, 604. A camera microcomputer 116 causes a focus lens 105 to be moved and stopped in an optical axis direction thereof based on results of the detection by the ring rotation sensors 603, 604. The camera microcomputer 116 controls the responsiveness of linear changes in focus to the rotating operation state of the ring member detected by the ring rotation sensors 603, 604 in accordance with at least the depth of focus.

8 Claims, 13 Drawing Sheets

U.S. PATENT DOCUMENTS

| | | |
|---|---|---|
| 6,731,339 B2 | 5/2004 | Ohkawara |
| 6,906,751 B1 | 6/2005 | Norita et al. |
| 7,006,137 B2 | 2/2006 | Kim et al. |
| 7,193,651 B2 | 3/2007 | Kato |
| 2002/0041334 A1 | 4/2002 | Okawara |
| 2002/0075395 A1 | 6/2002 | Ohkawara |
| 2003/0160891 A1 | 8/2003 | Mikamo |

* cited by examiner

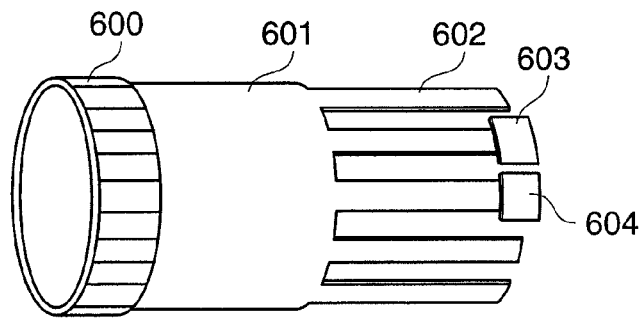
*FIG. 12A*
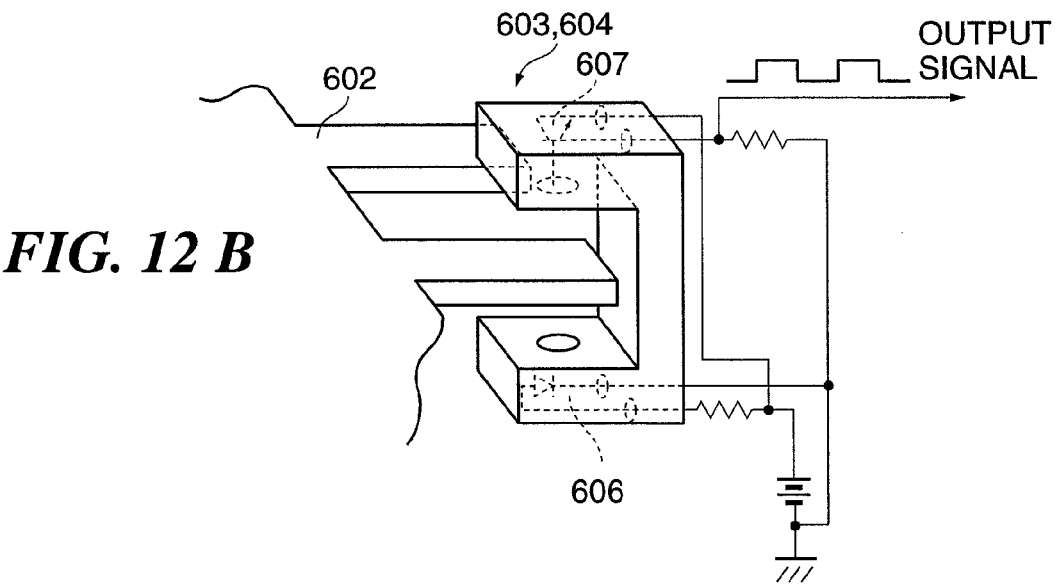
*FIG. 12B*
*FIG. 12C*
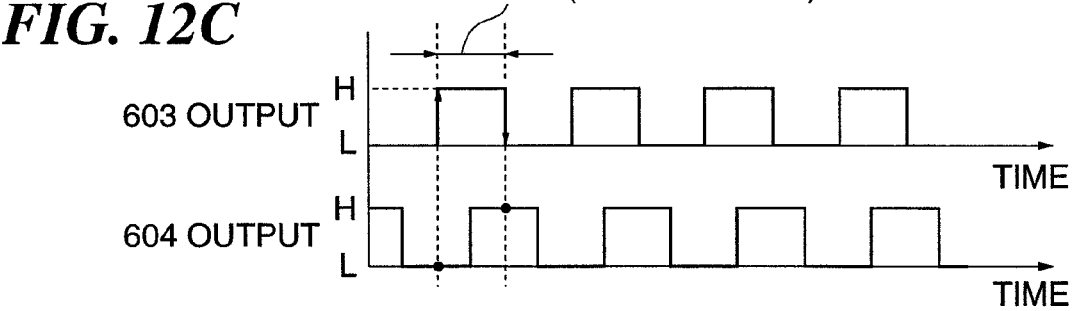
*FIG. 12D*
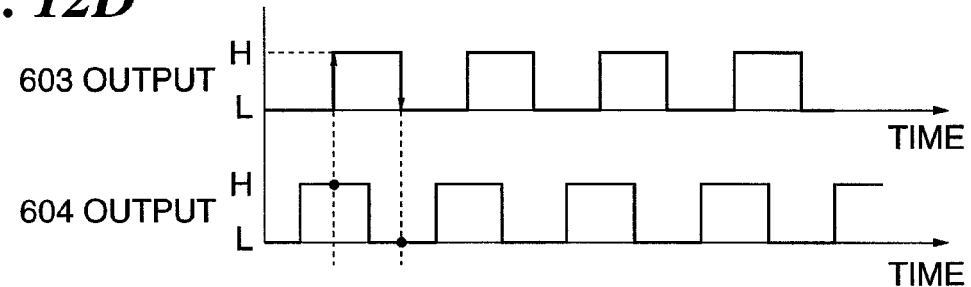

IMAGE PICKUP APPARATUS, CONTROL METHOD FOR THE SAME, AND PROGRAM FOR IMPLEMENTING THE CONTROL METHOD

This is a continuation of U.S. patent application Ser. No. 10/803,637 filed Mar. 18, 2004 which is based on and claims priority from Japanese Application No. 2003-078440 filed on Mar. 20, 2003, the contents of each are incorporated herein in their entirety by reference.

BACKGROUND OF THE INVENTION

1. Field of the Invention

The present invention relates to an image pickup apparatus, a control method for the same, and a program for implementing the control method, and in particular to an image pickup apparatus equipped with a function for manually moving a focusing lens, a control method for the same, and a program for implementing the control method.

2. Description of the Related Art

Conventionally, in consumer integrated-lens cameras, inner focus type lens units that can realize cost reductions, system simplifications, and reductions in the size and weight of a lens barrel have become predominant.

FIG. 10 is a schematic diagram showing the construction of a conventionally used inner focus type lens unit. In FIG. 10, reference numeral 101 designates a fixed first lens group, 102 a second lens group for zooming, 103 a diaphragm, 104 a fixed third lens group, 105 a fourth lens group (hereinafter referred to as the "focus lens") that has a focus adjusting function and a so-called compensating function that compensates movement of a focal plane due to the zooming, and 106 an image pickup surface.

In the lens system constructed as shown in FIG. 10, the focus lens 105 has both the focus adjusting function and the compensating function, so that even when the focal distance does not change, the position of the focus lens 105 for focusing on the image pickup surface 106 differs according to the distance to the subject.

If the position of the focus lens 105 for focusing on the image pickup surface 106 is continuously plotted as the subject distance is changed at respective focal distances, focus loci such as those shown in FIG. 11 are obtained. If one of the focus loci shown in FIG. 11 is selected according to the subject distance and the focus lens 105 is moved according to the selected focus locus, zooming can be carried out with no blurring.

To manually move the zoom lens or the focus lens in this kind of inner focus type lens unit, it is customary to provide an operating member that is disposed concentrically with the lens groups and the lens optical axis but is mechanically disconnected from the focus lens 105, to electrically detect an operation amount of the operating member, and to move the lens by an amount corresponding to the operation amount.

To achieve the same operational feel as a front lens focus type camera or as a professional camera, there has been proposed a method shown in FIGS. 12A to 12D where an encoder formed integrally with a rotating ring engages the lens barrel and the zoom lens or focus lens is moved by electrically detecting the rotational direction and rotational speed of this encoder.

In FIG. 12A, reference numeral 600 designates the rotating ring that is disposed in concentricity with the focus lens 104 and engages the lens barrel, with this rotating ring 600 being formed integrally with the encoder 601 with a comb-shaped structure 602. Here, the rotating ring 600 is shown as an operating member for moving the focus lens 105 without actually contacting the focus lens 105, and will be referred to as a "focus ring" hereinafter.

The comb-shaped structure 602 is provided with two light projecting/receiving elements (hereinafter referred to as the "ring rotation sensors") 603, 604 each having a light projecting section 606 and a light receiving section 607 as shown in FIG. 12B. The comb-shaped structure 602 of the encoder 601 passes through gaps between the respective light projecting sections 606 and light receiving sections 607 of the ring rotation sensors 603, 604.

Accordingly, when a tooth of the comb-shaped structure 602 passes through one of the above-mentioned gaps, light from the light projecting section 606 is blocked and is no longer incident on the light receiving section 607, resulting in a large decrease in the output current of the light receiving section 607. Conversely, when a gap between teeth of the comb-shaped structure 602 passes through one of the above-mentioned gaps, light from the light projecting section 606 becomes incident on the light receiving section 607, so that there is a large increase in the output current of the light receiving section 607.

When the encoder 601 is rotated, the respective output signals of the ring rotation sensors 603, 604 change as shown in FIG. 12C or FIG. 12D. That is, the positional relationship between the ring rotation sensors 603, 604 is determined such that there is a suitable phase difference between the two output signals, and accordingly the rotation amount and/or rotational speed are detected based on the period of changes in the output signals and the rotational direction is detected based on the phase relationship between the two output signals.

It should be noted that the relationship between FIGS. 12C and 12D is such that if FIG. 12C shows output waveforms of the ring rotation sensors 603, 604 when the focus ring 600 is rotated forward, for example, FIG. 12D shows output waveforms of the ring rotation sensors 603, 604 when the focus ring 600 is rotated in reverse.

By providing the encoder 601 shown in FIGS. 12A to 12D and driving a lens actuator such as a stepping motor according to rotating operation of the focus ring 600, it is possible to carry out zooming operations and/or focusing operations using a power zoom and/or power focus while providing the exact same operational feel as a front lens type lens unit even with the inner focus type lens unit (see, for example, Japanese Laid-Open Patent Publication (Kokai) No. H10-10405).

However, during a manual operation of the above-described conventional inner focus type lens unit, if the rotational speed of the focus ring 600 is detected based on the output signals of the ring rotation sensors 603, 604 and control is provided to adjust the focus according to the detected rotational speed, the rotational position of the focus ring 600 at which a focused state is achieved will differ according to whether the focus ring 600 is rotated at low speed or at high speed, resulting in the problem of the focus ring 600 having a different operational feel to a focus ring that is mechanically connected to the focus lens.

On the other hand, if the focus movement amount (focus lens movement amount) is linearly varied in accordance with the rotation amount of the focus ring 600, it is possible to make the rotational position of the focus ring 600 that results in the focused state the same regardless of whether the focus ring 600 is rotated at low speed or at high speed, thereby realizing the same operational feel as a focus ring that is mechanically connected to the focus lens.

However, when the relationship between the focus movement amount the rotation amount of the focus ring 600 is made linear as above, it is difficult to obtain the optimal responsiveness of the focus movement amount to the rotation amount of the focus ring 600.

For example, if the responsiveness is set so low that focusing can be obtained by slight movements of the focus ring 600, in operational conditions where high responsiveness is required, such as the case where rack focus is carried out starting from an extremely blurred state, the focus ring 600 has to be rotated many times to rack focus before reaching the focused position.

On the other hand, if responsiveness is given priority such that a large focus movement amount can be obtained via a small rotation amount of the focus ring 600, during focusing operations that finely adjust the focus at close to the focused position, a phenomenon called "hunting" occurs where a small rotation of the focus ring 600 moves the focus beyond the focused position and then small reverse rotation of the focus ring 600 moves the focus back beyond the focused position once again.

To solve this problem, it is necessary to increase the detection accuracy of the rotation amount of the focus ring 600. To increase the detection accuracy of the rotation amount, it would be possible to make the pitch of the teeth of the comb-shaped structure 602 shown in FIGS. 12A to 12D smaller to increase the number of teeth per rotation, but since there is a limit on the mechanical precision with which such teeth can be formed, it becomes necessary to increase the diameter of the focus ring 600, which hinders reductions being made in size and cost.

Also, in recent years, miniaturization and increased pixel density have been progressing for image pickup elements so that the permissible circle of confusion for picked-up images has become smaller. Therefore, even more precise focus control is now required for the functioning of the encoder 601, and even lower responsiveness of the focus movement amount to rotating operation of the focus ring 600 is desired. If the responsiveness is made lower, however, it is necessary to move the focus ring 600 even further when racking focus from a blurred state, leading to an appreciable decrease in operability.

Further, in the case where photography is continuously carried out with a reduced shutter speed (i.e., so-called "slow shutter photography") so as to secure sufficient brightness, such as when photographing a subject in low brightness conditions, picked-up images are displayed on a monitor or the like as intermittent images (for example, images displayed in two frames per second when the shutter speed is ½ sec). Therefore, the photographer can only intermittently check changes in focus occurring in response to operations of the focus ring 600 and that there is a time lag between an operation of the focus ring 600 and the displaying of picked-up images with the changed focus.

Therefore, even if the ring responsiveness is not problematic for normal shutter speeds, at slow shutter speeds, if the photographer tries to change the focus in response to the focusing degree of displayed picked-up images, the photographer himself/herself will activate the servo, which results in hunting of the focus movement and hence in extreme difficulty in focusing.

SUMMARY OF THE INVENTION

It is an object of the present invention to provide an image pickup apparatus and a control method for the same, which are capable of optimizing the responsiveness of linear changes in focus to operations of a ring member without sacrificing the operability of the ring member, while using a small-sized, low-cost ring member for manual operations, and a program for implementing the control method.

To attain the above object, in a first aspect of the present invention, there is provided an image pickup apparatus an image pickup apparatus, comprising a focus lens, a rotatable ring member, a detection device that detects a rotating operation state of the ring member, a control device that causes the focus lens to be moved and stopped in an optical axis direction thereof based on results of the detection by the detection device, and a responsiveness control device that controls responsiveness of linear changes in focus to the rotating operation state of the ring member detected by the detection device in accordance with at least depth of focus.

According to the image pickup apparatus of the first aspect, it is possible to optimize the responsiveness of linear changes in focus to operations of a ring member without sacrificing the operability of the ring member, while using a small-sized, low-cost ring member for manual operations.

Preferably, the image pickup apparatus comprises an optical lens group including the focus lens, a recording device that records a picked-up image picked up via the optical lens group onto a recording medium, and the responsiveness control device controls the responsiveness of linear changes in focus to the rotating operation state of the ring member detected by the detection device in accordance with the depth of focus that has been corrected based on a pixel density of the picked-up image and a pixel density of a recorded image to be recorded onto the recording medium.

Preferably, the responsiveness control device controls the responsiveness of linear changes in focus to the rotating operation state of the ring member detected by the detection device in accordance with exposure time.

Preferably, the responsiveness control device controls responsiveness of a linear focusing movement amount of the focus lens as the responsiveness of linear changes in focus.

Preferably, the responsiveness control device controls responsiveness of a linear focusing speed of the focus lens as the responsiveness of linear changes in focus.

Preferably, the detection device comprises a photoelectric conversion type sensor.

Preferably, the detection device comprises a magnetic type sensor.

Preferably, the ring member is disposed in concentricity with an optical axis of the focus lens, and is mechanically disconnected from the focus lens.

Preferably, the focus lens comprises an inner focus type lens unit.

To attain the above object, in a second aspect of the present invention, there is provided a control method for an image pickup apparatus including at least a rotatable ring member, a detection device that detects a rotating operation state of the ring member, and a control device that causes a focus lens to be moved and stopped in an optical axis direction thereof based on results of the detection by the detection device, the control method comprising a step of controlling responsiveness of linear changes in focus to the rotating operational state of the ring member detected by the detection device in accordance with at least depth of focus.

To attain the above object, in a third aspect of the present invention, there is provided a control program for causing a computer to execute a control method for an image pickup apparatus including at least a rotatable ring member, a detection device that detects a rotating operation state of the ring member, and a control device that causes a focus lens to be moved and stopped in an optical axis direction thereof based on results of the detection by the detection device, the control method comprising a step of controlling responsiveness of linear changes in focus to the rotating operation state of the ring member detected by the detection device in accordance with at least depth of focus.

The above and other objects, features, and advantages of the invention will become more apparent from the following detailed description taken in conjunction with the accompanying drawings.

BRIEF DESCRIPTION OF THE DRAWINGS

FIGS. 12A to 12D are diagrams useful in explaining an encoder formed integrally with a focus ring.

DESCRIPTION OF THE PREFERRED EMBODIMENTS

The present invention will now be described in detail with reference to the drawings showing preferred embodiments thereof.

Figure 1:
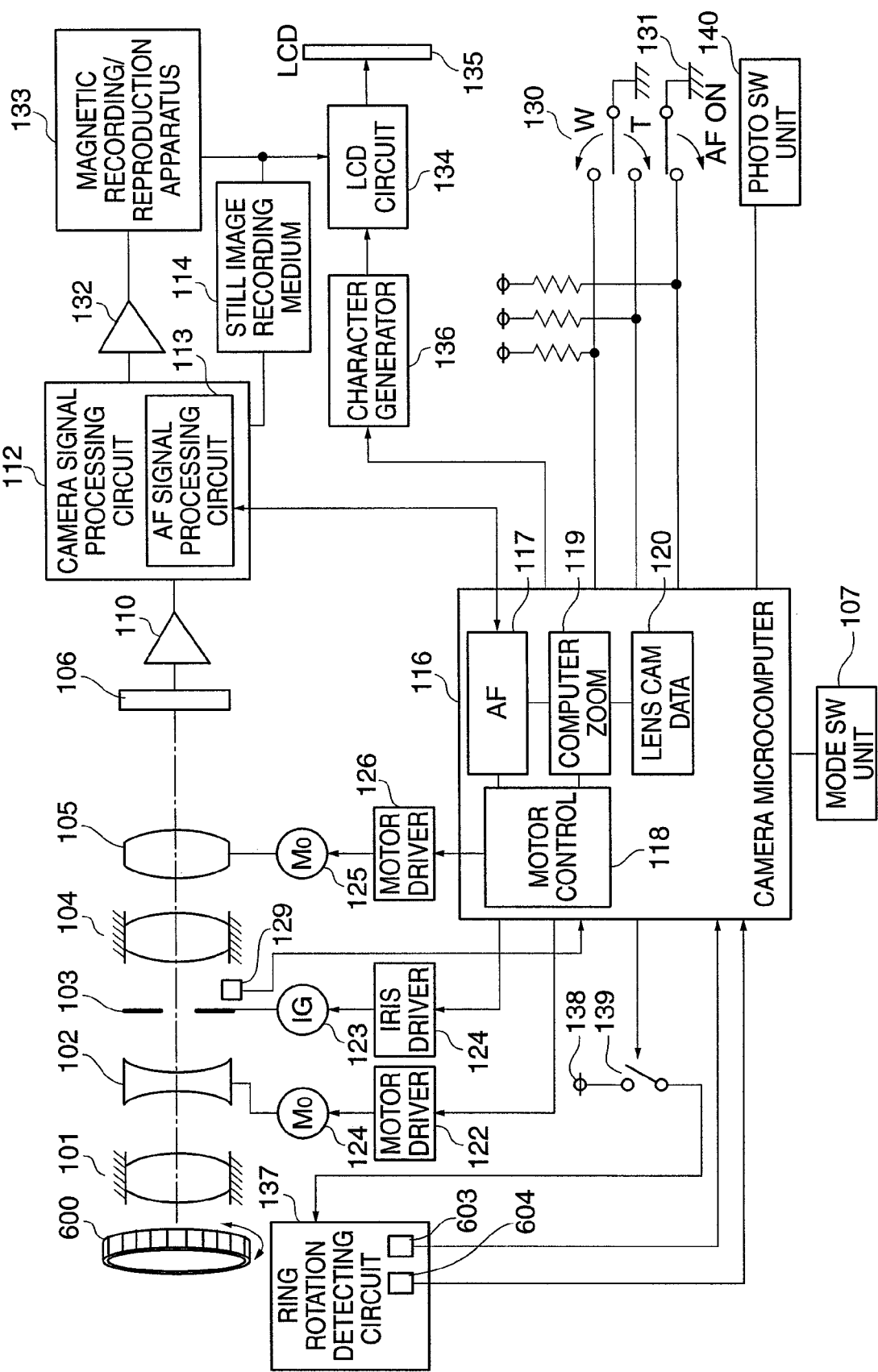
FIG. 1 is a schematic diagram showing the construction of an image pickup apparatus according to a first embodiment of the present invention.

FIG. 1 is a schematic diagram showing the construction of an image pickup apparatus according to a first embodiment of the present invention.

In FIG. 1, light from the subject passes through a fixed first lens group 101, a second lens group (hereinafter, "zoom lens") 102 that carries out zooming, a diaphragm 103, a fixed third lens group 104, and a fourth lens group (hereinafter "focus lens") 105 with a focus adjusting function and a compensating function for compensating for movement of a focal plane due to zooming, so that an image is formed on an image pickup element 106, such as a CCD (Charge Coupled Device).

A focus ring 600, and ring rotation sensors 603, 604 shown in FIG. 1 are the same as described in the related art and have the same functions. A ring rotation detecting circuit 137 is equivalent to a circuit shown in FIG. 2, referred to later.

An optical image that has been formed on the image pickup element 106 by light that has passed through the respective lenses is subjected to photoelectric conversion, is amplified to an optimal level by an amplifier 110, and is then inputted to a camera signal processing circuit 112 as an image pickup signal (picked-up image signal). The inputted signal is converted to a normal television signal by the camera signal processing circuit 112, amplified to an optimal level by an amplifier 132, and then sent to a magnetic recording/reproduction apparatus 133 and recorded as a picked-up image. The picked-up image signal is also sent to an LCD (Liquid Crystal Display) circuit 134 and displayed on an LCD 135.

It should be noted that information for informing the photographer of a photographic mode, a photographic state, warnings, and the like are also displayed on the LCD 135. At this time, a character generator 136 is controlled by a camera microcomputer 116 to fetch a character signal relating to the above information, and the character signal is mixed with the picked-up image signal by the LCD circuit 134 so that the information is displayed superimposed on the picked-up image on the LCD 135.

The image pickup signal inputted to the camera signal processing circuit 112 can also be subjected to a JPEG conversion process using an internal memory and recorded on a still image recording medium 114 such as a card medium. In addition, the image pickup signal inputted to the camera signal processing circuit 112 is inputted to an AF signal processing circuit 113 that generates an AF evaluation value. This AF evaluation value is read by the camera microcomputer 116 and is used for focusing control.

The camera microcomputer 116 detects respective states of a zoom switch 130 and an AF switch 131, and a state of a photo switch unit 140. The photo switch unit 140 has two positions that depend on an amount of depression of the switch. One position is a half pressing that can result in a focus lock operation being carried out at the focused position. Another position is a full pressing (deep pressing) that can result in an image being captured into an internal memory, not shown, inside the camera signal processing circuit 112, and a still image being recorded in the magnetic recording/reproduction apparatus 133, the still image recording medium 114, or the like.

The camera microcomputer 116 determines whether moving image pickup or still image pickup is being carried out according to the state of a mode switch unit 107, and controls the magnetic recording/reproduction apparatus 133, the still image recording medium 114, or the like via the camera signal processing circuit 112, to supply a suitable image signal for the recording medium. When the mode switch unit 107 is in a reproduction state, the camera microcomputer 116 provides control such that recorded images are read from the magnetic recording/reproduction apparatus 133 or the still image recording medium 114 and reproduction is carried out based on the read images.

The camera microcomputer 116 has a motor controller 118, which controls a zoom motor driver 122 and a focus motor driver 126 as described below based on a computer zoom program 119 to carry out a zooming operation.

That is, when the AF switch 131 is OFF and the zoom switch 130 is pressed, the motor controller 118 carries out a zooming operation by driving the zoom lens 102 in one of a telephoto direction and a wide-angle direction depending on a direction in which the zoom switch 130 is being pressed and also driving the focus lens 105. At this time, the motor controller 118 sends signals to the zoom motor driver 122 and the focus motor driver 126 based on lens cam data 120 stored in advance to control driving of a lens motor 121 and a focus motor 125.

When the AF switch 131 is ON and the zoom switch 130 is pressed, the focused state needs to be maintained, so that the motor controller 118 refers not only to the lens cam data 120 but also to an AF evaluation value signal sent from the AF signal processing circuit 113 and carries out a zooming operation while the focus lens is maintained at a position at which the highest AF evaluation value is obtained.

The motor controller 118 carries out focusing control through motor control described below. That is, when the AF switch 131 is ON but the zoom switch 130 is not pressed, the motor controller 118 sends, in accordance with an AF program 117, a signal to the focus motor driver 126 so that the AF evaluation signal sent from the AF signal processing circuit 113 has the highest value. By moving the focus lens 105 using the focus motor 125 in this way, an automatic focus adjusting operation is carried out.

When a manual focusing mode is set via the mode switch unit 107 (in the case where the focus ring 600 is rotated in a state where the AF switch 131 is OFF and the zoom switch 130 is not pressed), the motor controller 118 provides control to move the focus lens 105 according to the rotating operation state of the focus ring 600 to change the focus according to a manual focusing operation.

The camera microcomputer 116 carries out ON/OFF control of a switch 139 (indicated by symbol Vcc-SW in FIGS. 2A and 2B) directly connected to a power supply 138 to turn on and off the power supply to the ring rotation detecting circuit 137.

Figure 2A:
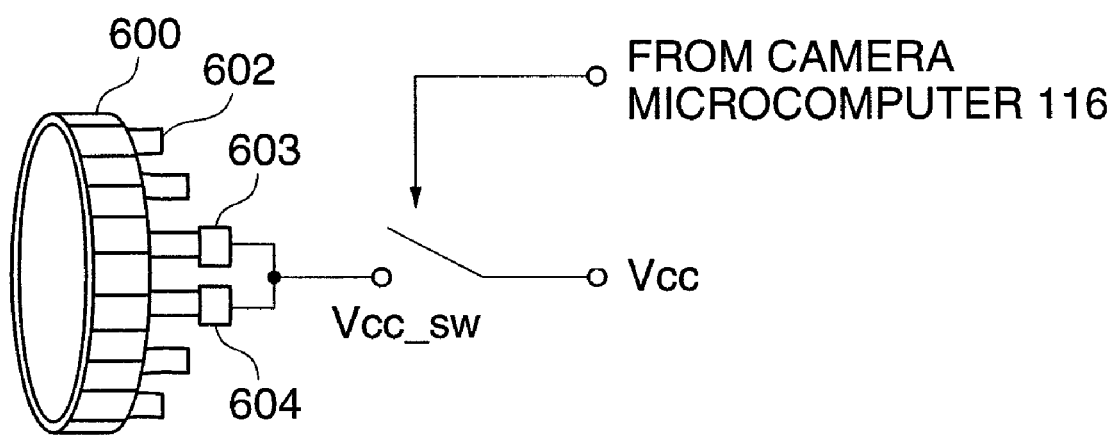
FIG. 2A is a diagram showing the electrical connection of a ring rotation detecting circuit shown in FIG. 1.
Figure 2B:
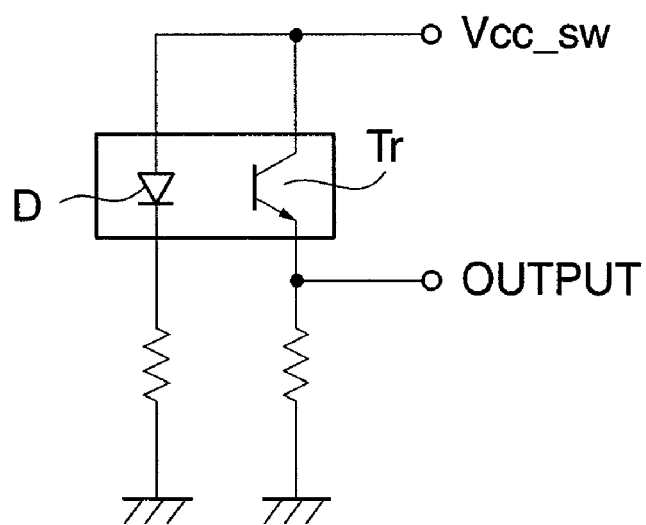
FIG. 2B is a circuit diagram showing an equivalent circuit of the ring rotation detecting circuit.

FIGS. 2A and 2B show the electrical connection of the ring rotation detecting circuit 137 shown in FIG. 1 and the equivalent circuit of the same, respectively.

It should be noted that the camera microcomputer 116 turns on power to the ring rotation detecting circuit 137 only during the manual focus mode to reduce power consumption.

Figure 3A:
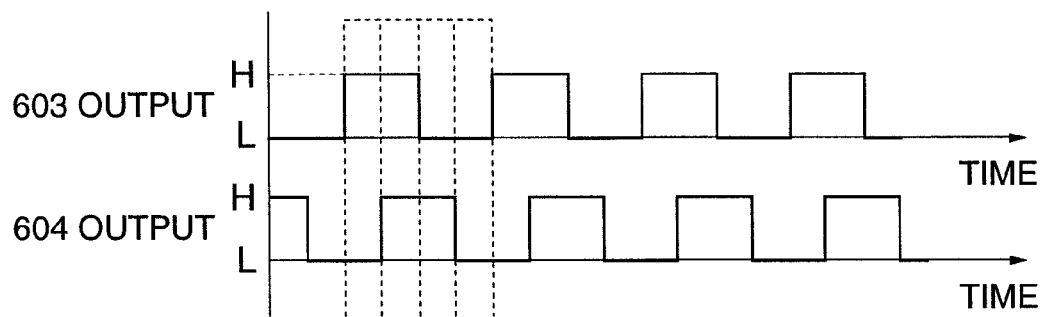
FIGS. 3A to 3C are diagrams useful in explaining a method of generating an up/down count value by subjecting two-phase pulses to quad-edge evaluation.
Figure 3B:
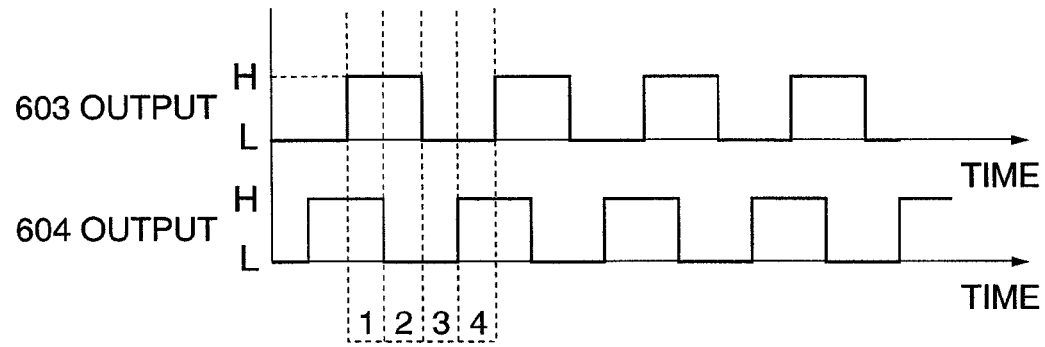

When the ring rotation detecting circuit 137 is ON, photodiodes D (refer to FIG. 2B) of the ring rotation sensors 603, 604 are lit, but, as the focus ring 600 rotates, light is repeatedly allowed to pass and blocked by the teeth of the encoder 601, so that respective output signals of phototransistors Tr (refer to FIG. 2B) are pulse signals (refer to FIGS. 3A and 3B).

The two ring rotation sensors 603, 604 are disposed with a phase difference of 90° between the respective output signals so that a two-phase pulse output is sent to the camera microcomputer 116. The camera microcomputer 116 determines the rotational direction by detecting the phase relationship between the two-phase pulses, and detects the rotation amount by counting the number of logical changes in the two-phase pulses. More specifically, an event counting function and a pulse accumulator function for two-phase pulses that are provided in microcomputers in general as normal functions are used to generate an up/down count value in accordance with the rotational direction and rotation amount by hardware without skipping pulses.

Figure 3C:
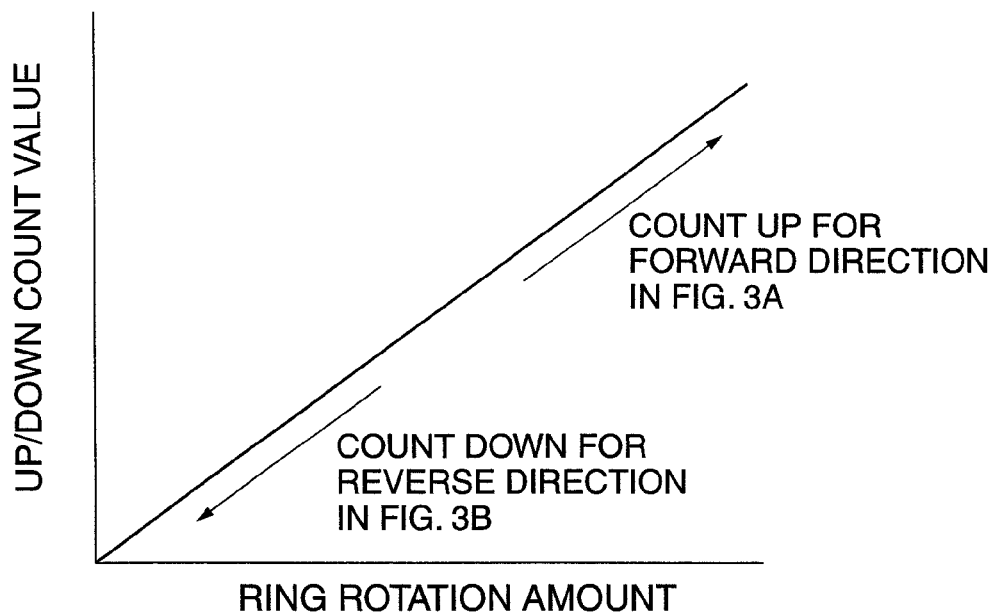

FIGS. 3A to 3C are diagrams useful in explaining the method of generating the up/down count value by subjecting the two-phase pulses to quad-edge evaluation. FIGS. 3A and 3B show two-phase pulse waveforms obtained with different rotational directions of the focus ring 600, i.e., forward rotation and reverse rotation thereof, and FIG. 3C is a graph schematically showing the generated up/down count value.

Here, if the focus ring 600 starts to be rotated in the forward direction as shown in FIG. 3A in the phase state shown by symbol (1) in FIGS. 3A and 3B so that the phase state changes in the order of (1), (2), (3) and (4), the output states of the ring rotation sensors 603, 604 change in the order of (H,L), (H,H), (L,H) and (L,L). As shown in FIG. 3C, such changes in state cause an increase in the up/down count value.

On the other hand, if the focus ring 600 starts to be rotated in the reverse direction as shown in FIG. 3B so that the phase state changes in the order of (1), (2), (3) and (4), the output states of the ring rotation sensors 603, 604 change in the order of (H,H), (H,L), (L,L) and (L,H), so that as shown in FIG. 3C, the up/down count value decreases.

The event counter function carries out counting by detecting a detecting edges of the two-phase pulses to detect the status thereof and detecting the high/low status of one of the two-phase pulses when the other pulse shows an edge change, to thereby increment or decrement the up/down count value by 1. This detection is carried out for both of the two-phase pulses, so that it is possible to generate an up/down count value in accordance with the rotational direction with quad-edge evaluation accuracy.

Figure 4:
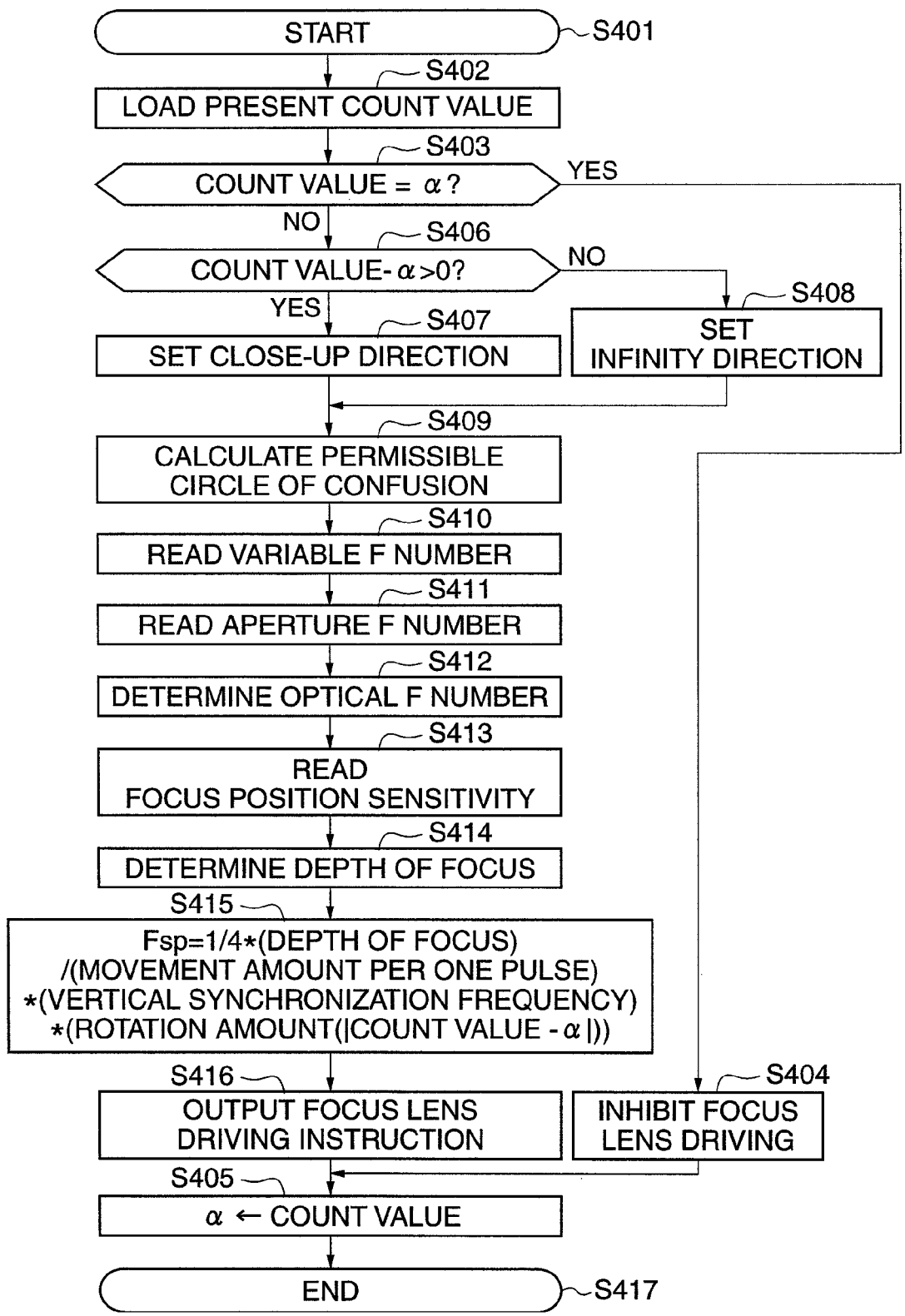
FIG. 4 is a flowchart showing focusing control based on rotating operation of a focus ring according to the first embodiment.

FIG. 4 is a flowchart showing focusing control for moving the focus lens 105 according to the rotation of the focus ring 600 detected by the detection method shown in FIGS. 3A to 3C. The focusing control shown in FIG. 4 is carried out in synchronism with a vertical synchronization signal for the image signal (this is also the case with a second embodiment shown in FIGS. 7A and 7B and a third embodiment shown in FIGS. 8A and 8B). Also, the focusing control according to the first embodiment is carried out by the camera microcomputer 116 (this is also the case with focusing control according to the second embodiment shown in FIGS. 7A and 7B and the third embodiment shown in FIGS. 8A and 8B).

When the process is started in a step S401 in FIG. 4, first the count value that is automatically counted by the event count function is read (step S402). In a step S403, the read count value is compared with the preceding count value α and if there is a change in the count value, it is determined that the focus ring 600 has been rotated so that the process proceeds to a step S406.

On the other hand, if there has been no change in the count value, it is determined that the focus ring 600 has not been rotated, so that driving of the focus lens 105 is inhibited (step S404), the count value read in the step S402 is stored as the preceding count value α (step S405), and the process is terminated (step S417).

In the step S406, it is determined whether the count value is higher or lower than the preceding count value α, and when the count value is higher, the driving direction of the focus lens 105 is set to a close-up direction (step S407), and when the count value is lower, the driving direction of the focus lens 105 is set to an infinite direction (step S408).

Next, in steps S409 to S415, the focusing speed is set in accordance with a difference between the count value and the preceding count value. A focus driving instruction is outputted to the focus motor driver 126 (step S416), the count value read in the step S402 is stored as the preceding count value α (the step S405), and the process is terminated (step S417).

Next, the processing of the steps S409 to S415 will be described in detail. In the steps S409 to S413, pre-processing is carried out to determine the depth of focus in the present lens state in a step S414. The depth of focus is expressed as a range (width) of depth in which no blurring can be visibly recognized, and is generally expressed as a multiple Fδ of the F number of the lens and the diameter δ of the permissible circle of confusion.

This value Fδ expresses a range of depth on the sensitive surface of the image pickup element 106, and corresponds to a range of relative movement amount in which changes in focus cannot be perceived even if the focus lens 105 is moved relative to the image pickup element 106. In the present embodiment where focus is adjusted by moving the focus lens 105, even if the focus lens 105 is moved by applying one pulse to the focus motor 125, the amount of this movement corresponds to an amount of movement of the image pickup element 106 which is less than the focus position sensitivity (e.g. 0.8).

Accordingly, in the present embodiment, the depth of focus when adjusting focus with the focus lens 105 is given by Equation 1 below.

$$\text{depth of focus} = F\delta/\text{focus position sensitivity}.$$

The F number of the lens includes a so-called "variable F number" which represents brightness changing as the amount of light passing through the zoom lens 102 changes with change in the focal distance, and an F number which is determined by a brightness adjustment carried out during aperture control, and the larger one of these F numbers corresponds to the actual brightness of the lens.

Figure 5A:
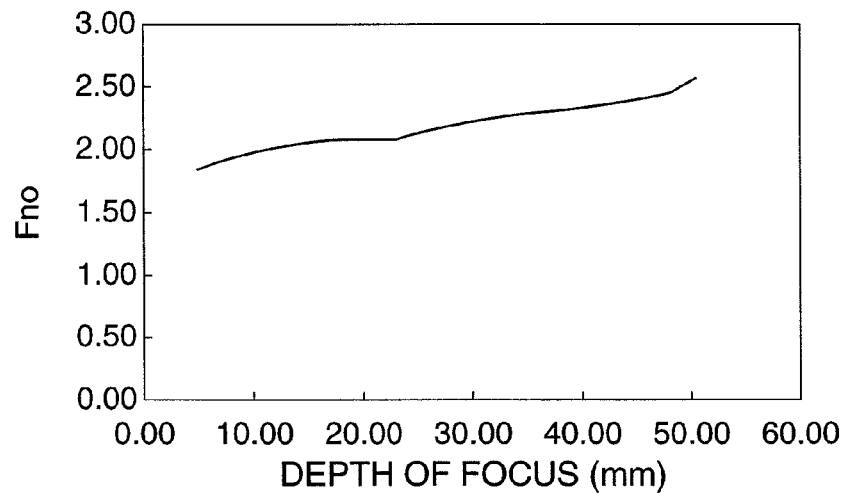
FIG. 5A is a graph showing changes in F number according to change in depth of focus.
Figure 5B:
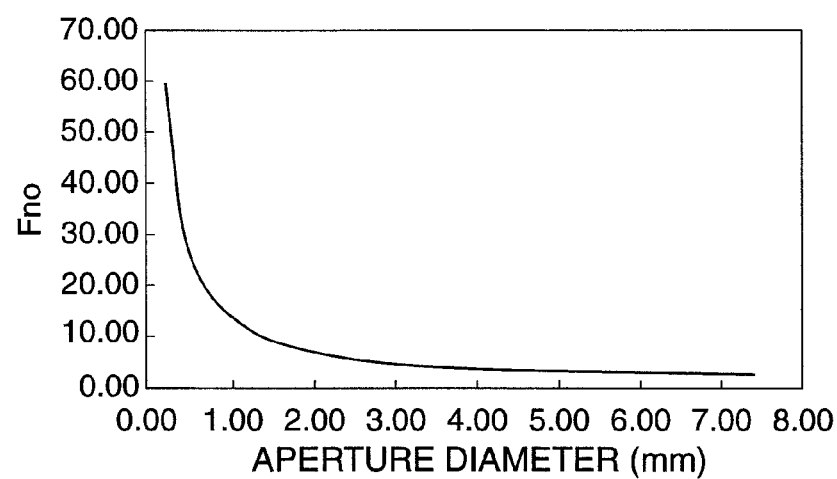
FIG. 5B is a graph showing changes in F number according to change in aperture diameter.
Figure 5C:
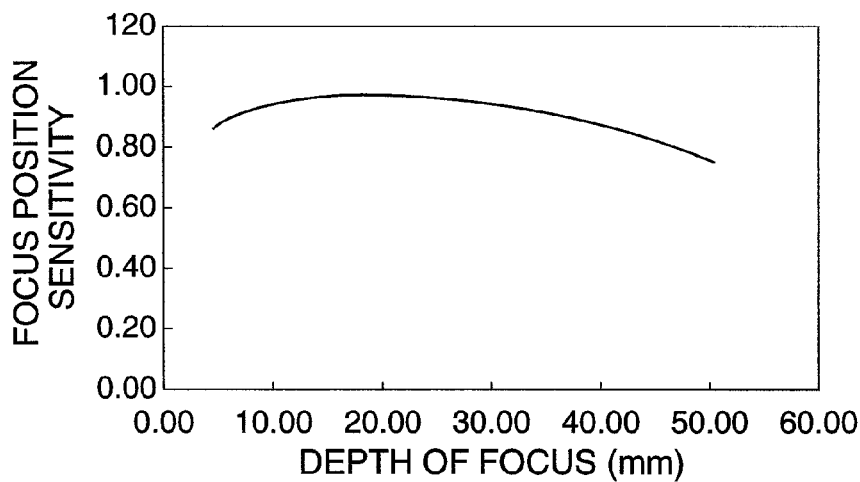
FIG. 5C is a graph showing changes in focus position sensitivity according to change in focal distance.

Change in the F number with change in the focal distance and change in the F number with change in the aperture diameter are shown in FIGS. 5A and 5B, respectively. FIG. 5C shows the focus position sensitivity of the focus lens 105 that varies with change in the focal distance.

The changes shown in FIGS. 5A to 5C are stored in the camera microcomputer 116 in advance as a look-up table, and a table output value is obtained in accordance with the focal distance ("zoom lens position information", i.e., a number of zoom driving pulses applied to the lens motor 121 in FIG. 1) and the aperture diameter ("aperture position information", i.e., an output from an encoder 129 in FIG. 1) as input variables.

Referring again to FIG. 4, in the step S409 the diameter δ of the permissible circle of confusion is determined by calculation. In general, in the case of a fixed focal distance camera, the diameter δ of the permissible circle of confusion corresponds to approximately double the cell size, that is, the pixel size, of the image pickup element 106. This is because the size of one pixel (cell size) defines the actual resolution limit, but since a low-pass filter is disposed before the image pickup element 106 so as to prevent alias components of a specific frequency or above from forming spurious resolution, such as moirés, on a formed picked-up image, the size of one pixel that defines the actual resolution limit is equal to the size of approximately two pixels (approximately double the cell size). This is shown in Equation 2 below.

$$\text{diameter } \delta \text{ of permissible circle of confusion} = \text{cell size of the image pickup element} \times 2$$

Next, based on the position of the zoom lens 102, the F number for the "variable F component" is read from the look-up table shown in FIG. 5A (step S410), and the F number corresponding to the aperture position is read from the look-up table shown in FIG. 5B (step S411). In the step S412, it is determined that the larger one of the F numbers read in the steps S410 and S411 is set to the F number for the present optical system. Also, in the step S413, the focus position sensitivity corresponding to the present position of the zoom lens 102 is read from the look-up table shown in FIG. 5C, and in the step S414, the depth of focus is determined from Equation 1 described above.

The step S415 is for carrying out processing for setting the responsiveness of the focus movement amount (change in focus) to rotating operations of the focus ring 600 to a responsiveness standardized according to the depth of focus, which is a characteristic of the present invention.

By carrying out the processing in the step S415, the manner in which the focus changes in response a rotating operation of the focus ring 600 always depends on changes in the focus movement amount standardized according to the depth of focus, and therefore the operational feel experienced by the photographer when rotating the focus ring 600 to focus the lens is the same for every kind of photographic scene.

In particular, as the lens F number, which changes in accordance with change in the focal distance and change in the aperture state, becomes larger, the responsiveness of the focus movement amount (change in focus) corresponding to a rotating operation of the focus ring 600 can be set higher, and therefore it is possible not only to rack focus with a small amount of rotating operation and but also to carry out fine focusing near a focused position, while keeping the apparent change in blurring even.

In the step S415, the focusing speed is changed in accordance with the rotation of the focus ring 600 so that the focus lens 105 moves with predetermined characteristics. The focusing speed is expressed as a number of pulses required for a stepping motor (the focus motor 125) to move for one second, and is thus expressed in units of pulses/second or "pps". In the present embodiment, the focus movement amount in one vertical synchronization period when the focus ring 600 is rotated by a minimum amount is set at ¼ of the depth of focus. That is, four focus stop positions are present within the depth of focus.

For this reason, the focusing speed Fsp is calculated according to Equation 3 given below. Here, multiplication by the vertical synchronization frequency is carried out to convert the focusing speed Fsp to pps units, and the depth of focus is divided by a movement amount of the focus lens 125 for one pulse to convert the units of distance for the depth of focus to pulse units.

$$Fsp = \tfrac{1}{4} \times (\text{depth of focus})/(\text{movement amount per one pulse}) \times (\text{vertical synchronization frequency}) \times (\text{rotation amount } (|\text{count value} - \alpha|))$$

Figure 9A:
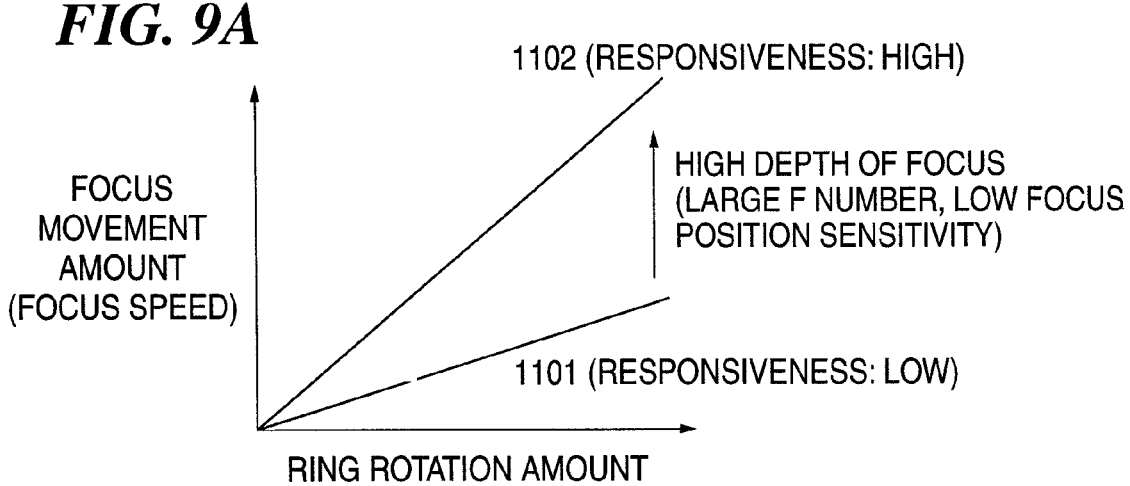
FIG. 9A is a graph showing responsiveness of a focus movement amount to a rotation amount of the focus ring in the first embodiment.

The response characteristics of the focus movement amount (focusing speed) with respect to the rotation of the focus ring 600 in the first embodiment are shown in FIG. 9A. The focus movement amount changes with linear characteristics with change in the amount of rotation of the focus ring 600. Therefore, the same focus state can be obtained at the same rotational position of the focus ring 600 regardless of whether the focus ring 600 has been rotated slowly or quickly.

As the depth of focus increases, the response characteristics 1101 can be increased as shown by response characteristics 1102. This makes it possible to achieve a fast response for a fast focus rack without the photographer having to rotate the focus ring 600 many times while maintaining four focus stop positions within the depth of focus even during fine focusing operations.

Next, a second embodiment of the present invention will be described.

According to the second embodiment, the responsiveness of the focus movement amount (change in focus) to rotating operation of the focus ring 600 is standardized according to the effective depth of focus based on the ratio of the pixel density of the picked-up image to the pixel density of a corresponding recorded image to be recorded on a recording medium.

For example, in recording still images onto a card medium or the like, all the pixels of the image pickup element 106 are recorded so that the depth of focus is equal to the diameter of permissible circle of confusion described with respect to the first embodiment. However, in recording moving images, only pixels stipulated by the DV format for a tape medium or the like are recorded, so that the effective depth of focus changes according to the ratio of the pixel density of the picked-up image to the pixel density of a corresponding recorded image to be recorded on the recording medium.

Figure 6:
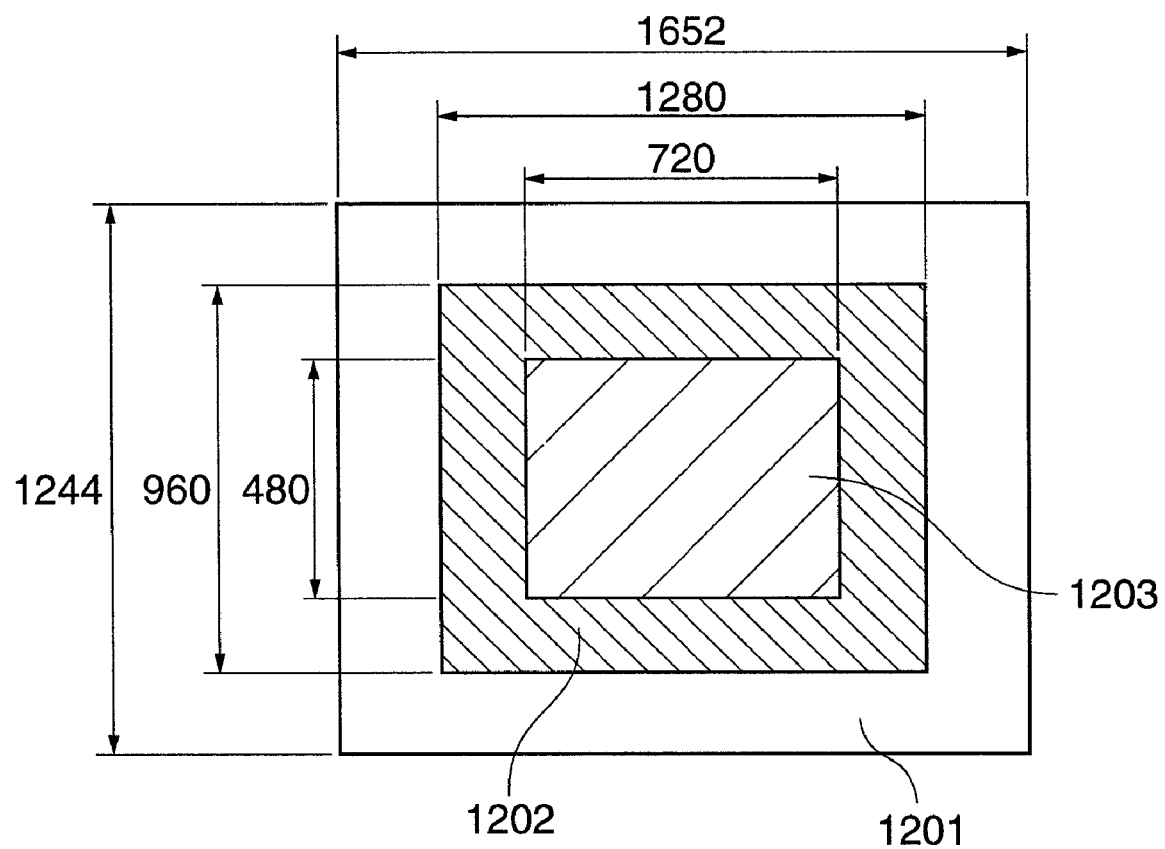
FIG. 6 is a diagram useful in explaining recording density when still images and moving images are recorded on a recording medium.

For example, assuming that the image pickup element 106 has two million pixels, as shown in FIG. 6, in recording a still image, 1,652 horizontal pixels by 1,244 vertical pixels for the total of two million pixels (see 1201 in FIG. 6) are recorded as they are, so that the diameter of permissible circle of confusion is determined by the cell size of the image pickup element 106. Conversely, in recording a moving image, the number of pixels of the picked-up image is compressed into 1,280 horizontal pixels by 960 vertical pixels for a total of 1.22 million pixels (see 1202 in FIG. 6) and 720 horizontal pixels by 480 vertical pixels for DV format (see 1203 in FIG. 6) are recorded, so that when the photographer views the recorded image, the diameter of permissible circle of confusion has effectively a size produced by multiplying the cell size by 1280/720 in the horizontal direction.

That is, in recording a moving image, the diameter of permissible circle of confusion can be increased 1280/720 times, so that compared to when a still image is recorded, the responsiveness of the focus movement amount (change in focus) to rotational movement of the focus ring 600 can be increased, and conversely, if the responsiveness is not increased by an amount corresponding to the increase in the diameter of permissible circle of confusion, the photographer will not be able to perceive the focus movement on a monitor or the like even if the focus ring 600 is rotated in the opposite direction.

Figure 7A:
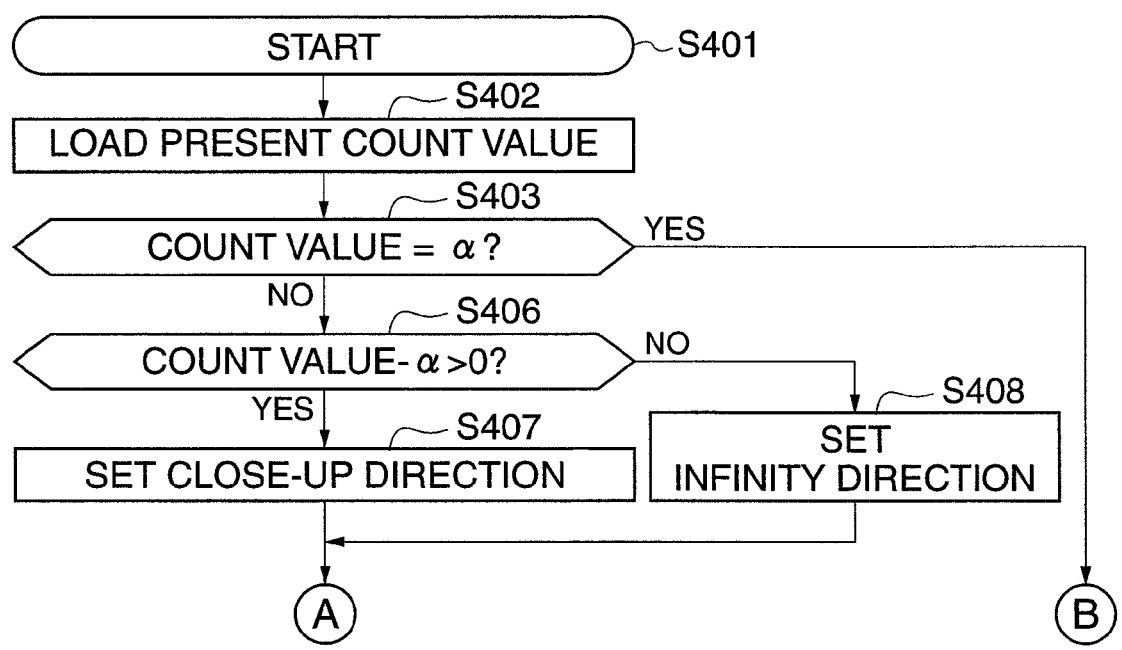
FIGS. 7A and 7B are flowchart showing focusing control based on rotating operation of the focus ring according to a second embodiment of the present invention.

Focusing control in accordance with rotating operation of the focus ring 600 according to the second embodiment that takes the above situation into account will now be described with reference to FIGS. 7A and 7B.

It should be noted that the system construction and the like are the same as those of the first embodiment, and therefore only parts that differ from those of the first embodiment will be described here. Also, steps in the flowchart in FIGS. 7A and 7B that correspond to those in the flowchart in FIG. 4 are designated by identical step numbers.

Figure 7B:
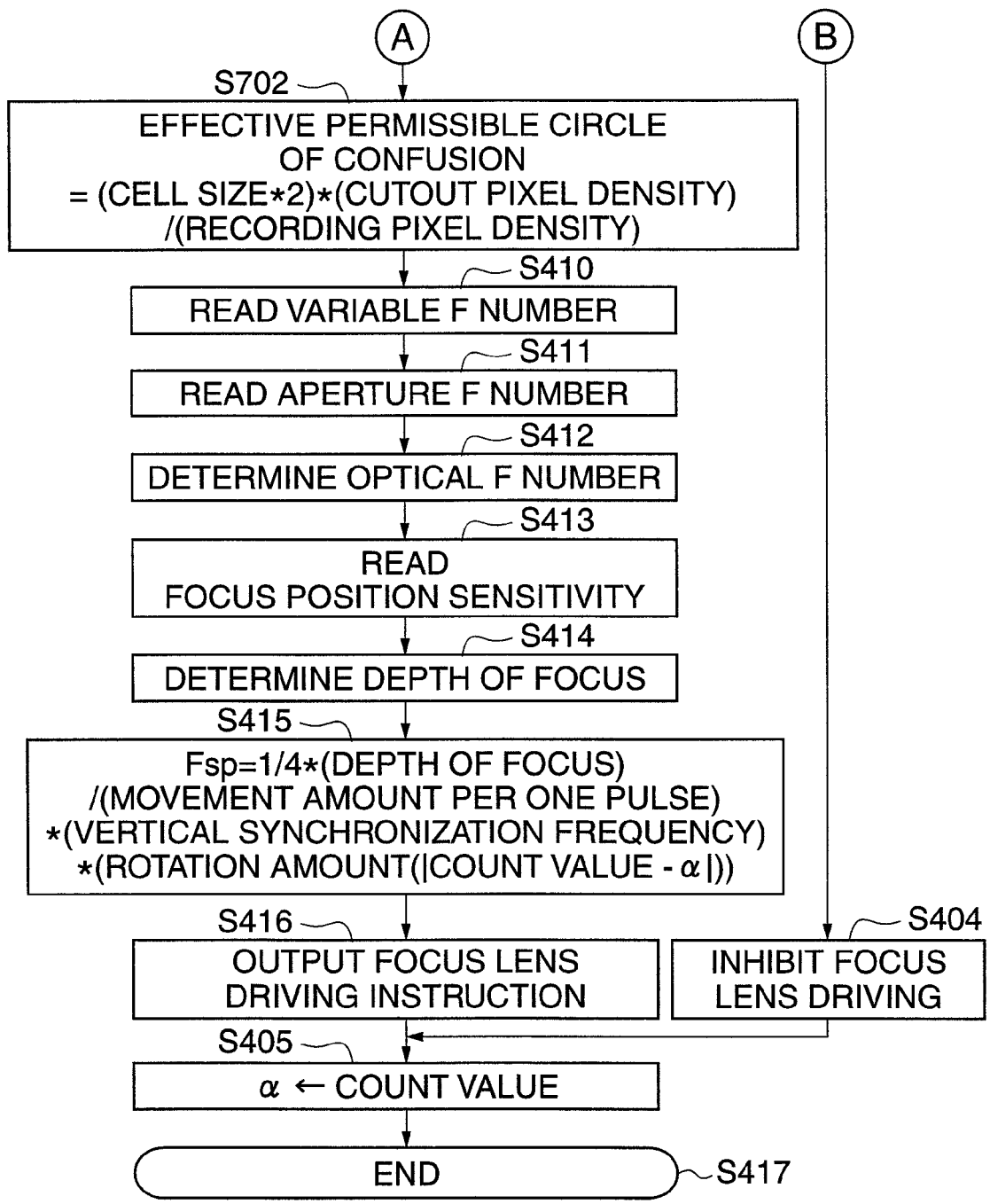

Steps S702 to S415 in FIG. 7B are for determining the responsiveness of the focus movement amount (change in focus) to rotating operation of the focus ring 600, with processing from the step S702 to the step S414 being for determining the effective depth of focus in accordance with the ratio of the pixel density of a picked-up image to the pixel density of a recorded image to be recorded on a recording medium and processing in the step S415 being for determining the focusing speed in accordance with the effective depth of focus in the same way as in the first embodiment.

In the step S702, the diameter of permissible circle of confusion of the image to be recorded on the actual recording medium is calculated in the photographic mode. This effective diameter of permissible circle of confusion is calculated according to Equation 4 below in which the right term of Equation 2 given above is multiplied by the reduction ratio.

Effective diameter δ of permissible circle of confusion= (cell size of image pickup element×2)×(cutout pixel density)/ (recording pixel density)

Here, "pixel density" corresponds to the number of pixels per angle of view for example, and the cutout pixel density corresponds to the number of pixels cutout angle of view (the diagonal length of the image pickup element 106). When the image pickup element 106 has two million pixels as described above, for example, the pixel density of the image pickup element 106 in the horizontal direction is 1,652 pixels when recording a still image and 1,280 pixels when recording a moving image.

On the other hand, the recording pixel density corresponds to the number of pixels per angle of view on the recorded image and therefore is 1,652 pixels when a still image and 720 pixels when recording a moving image. Thus, when recording a moving image, the diameter of permissible circle of confusion effectively becomes 1280/720 times larger so that the diameter of permissible circle of confusion effectively increases.

In recording a moving image, cutting out of pixels is carried out with a cutout ratio of "1", instead of a cutout ratio less than "1" for reduction, the number of cutout pixels is 720 horizontal pixels by 480 vertical pixels, so that the effective diameter of permissible circle of confusion is the same as for a still image. Conversely, cutting out of pixels is carried out with a cutout ratio of larger than "1" for enlargement, the diameter of permissible circle of confusion is reduced.

Figure 9B:
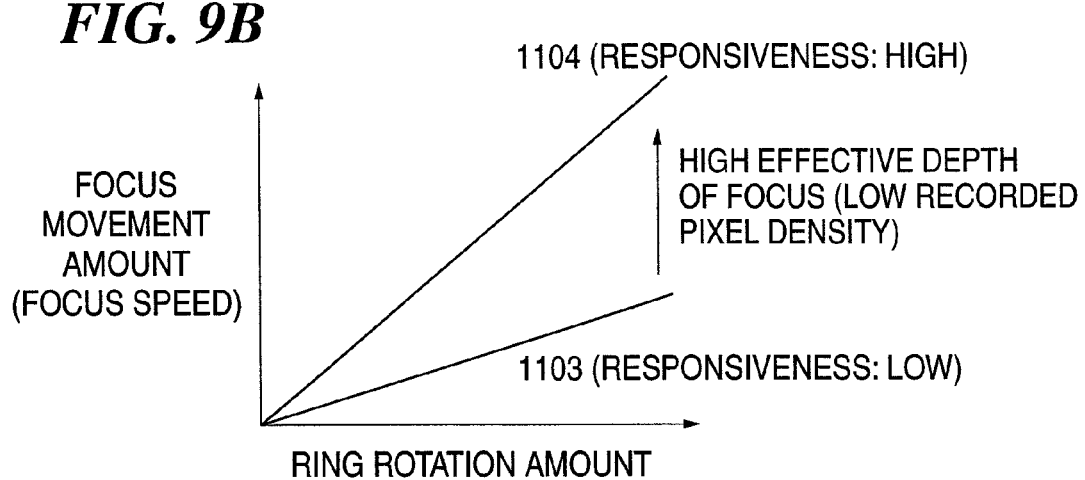
FIG. 9B is a graph showing responsiveness of the focus movement amount to the rotation amount of the focus ring in the second embodiment.

The response characteristics of the focus movement amount with respect to rotation of the focus ring 600 in the second embodiment are shown in FIG. 9B. That is, the larger the reduction ratio of the cutout processing, the deeper the effective depth of focus, which makes it possible to increase the responsiveness.

In this way, according to the second embodiment, the depth of focus that is based on the diameter of permissible circle of confusion determined by the pixel pitch of the image pickup element 106 and the F number of the optical system is converted to an effective depth of focus in terms of the effective diameter of permissible circle of confusion in accordance with the pixel density of the recorded image recorded on a recording medium, whereby the response characteristics of the focus movement amount (change in focus) with respect to rotation of the focus ring 600 can be optimized according to the pixel resolution of the recorded image.

For example, during still image photography that records all the effective pixels of the image pickup element 106, the pixel resolution is high, and therefore, focus rack is carried out in a fine manner with accurate responsiveness according to the pixel pitch of the image pickup element 106. During moving image photography that compresses part of the effective pixels and records the pixels after compression in DV format with 720 horizontal pixels by 480 vertical pixels onto tape, the pixel resolution of the image pickup element 106 apparently becomes lower. Therefore, by rotating the focus ring 600 in accordance with the lower value converted from the pixel pitch, it is possible to increase the responsiveness to focus racks that are often used during moving image photography while keeping the change in blurring in response to rotation of the focus ring 600 even.

Next, a third embodiment of the present invention will be described. In the third embodiment, smooth focusing can be realized by the focus ring 600 even during long exposure conditions, such as at a slow shutter speed. In the third embodiment, description of parts of the system construction and others that are the same as the first and second embodiments is omitted, and only parts that differ from the first and second embodiments will be described.

Figure 8A:
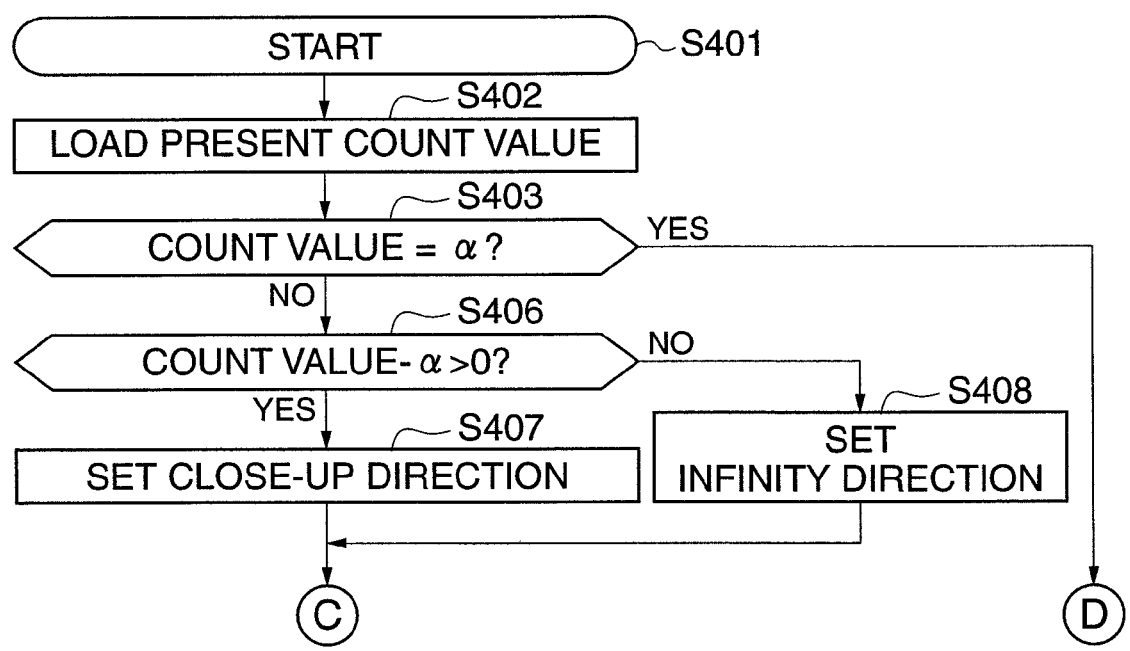
FIGS. 8A and 8B are flowchart showing focusing control based on rotating operation of the focus ring according to a third embodiment of the present invention.

Focusing control according to the third embodiment in response to rotating operation of the focus ring 600 will be described with reference to flowchart in FIGS. 8A and 8B. It should be noted that steps in the flowchart in FIGS. 8A and 8B that are the same as in the flowcharts in FIGS. 4, 7A and 7B are designated by identical step numbers.

Figure 8B:
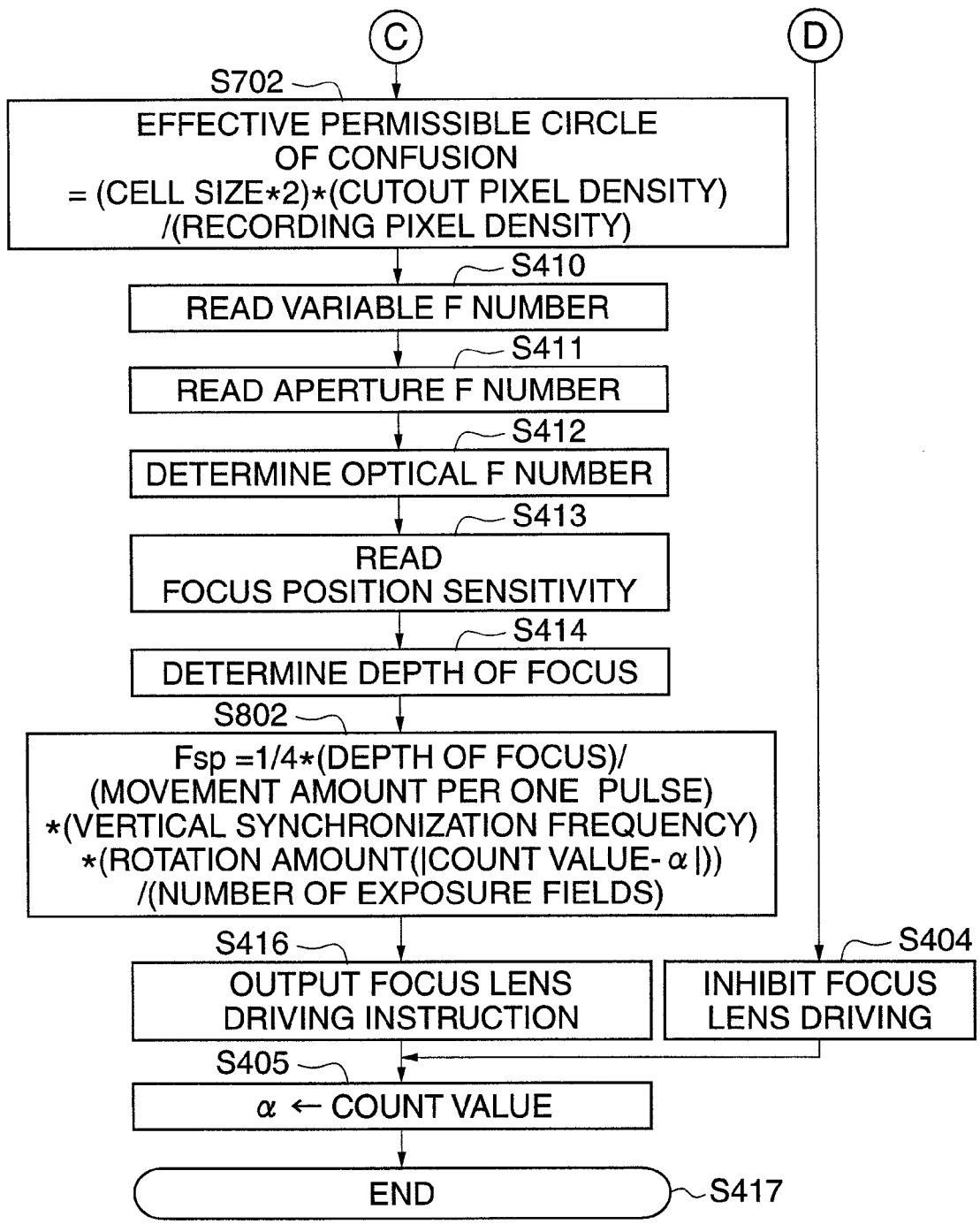

Steps S702 to S802 in FIG. 8B are for determining the responsiveness of the focus movement amount (change in focus) to a rotating operation of the focus ring 600, with processing from the steps S702 to S414 being for determining the effective depth of focus in accordance with the pixel density of a recorded image to be recorded on a recording medium (this is the same as in the second embodiment) and processing in the step S802 being for determining the focusing speed in accordance with the effective depth of focus and the exposure time.

In the step S802, an equation for calculating the focusing speed in the step S802 is used, i.e. Equation 5 given below, which is produced by dividing the right term of Equation 3 described above by a number of exposure fields.

$Fsp=\frac{1}{4}\times$(depth of focus)/(movement amount per one pulse)/(vertical synchronization frequency)$\times$(rotation amount(|count value-$\alpha$|))/(number of exposure fields)

Here, the "number of exposure fields" is determined by the shutter speed applied during photography. For an NTSC camera, for example, the number of exposure fields is set to "1" for a shutter speed of 1/60 sec or higher, to "2" for a shutter speed of 1/30 sec, and to "30" for a slow shutter speed of 1/2 sec.

Figure 9C:
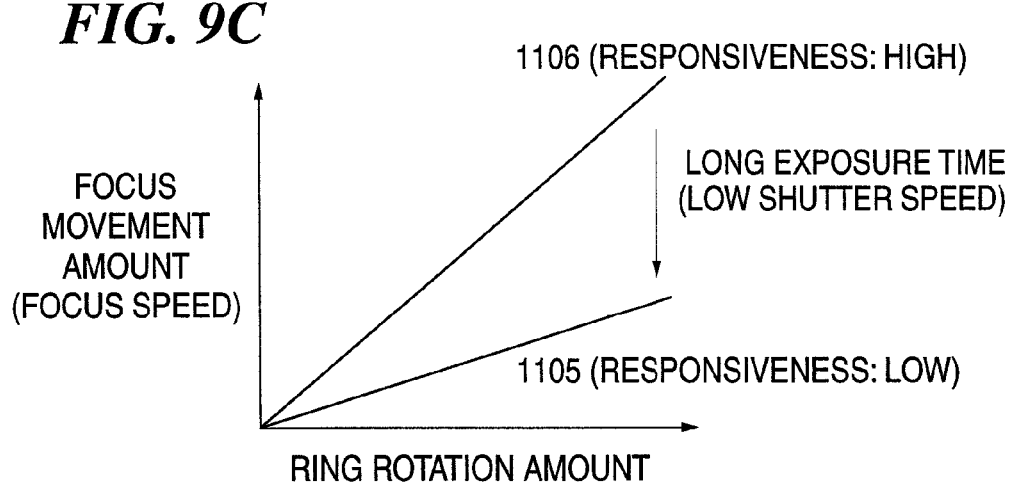
FIG. 9C is a graph showing responsiveness of the focus movement amount to the rotation amount of the focus ring in the third embodiment.
Figure 10:
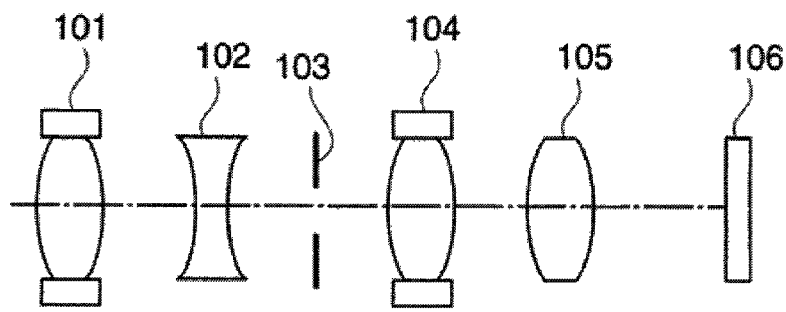
FIG. 10 is a schematic diagram showing the construction of a conventional inner focus-type lens system.
Figure 11:
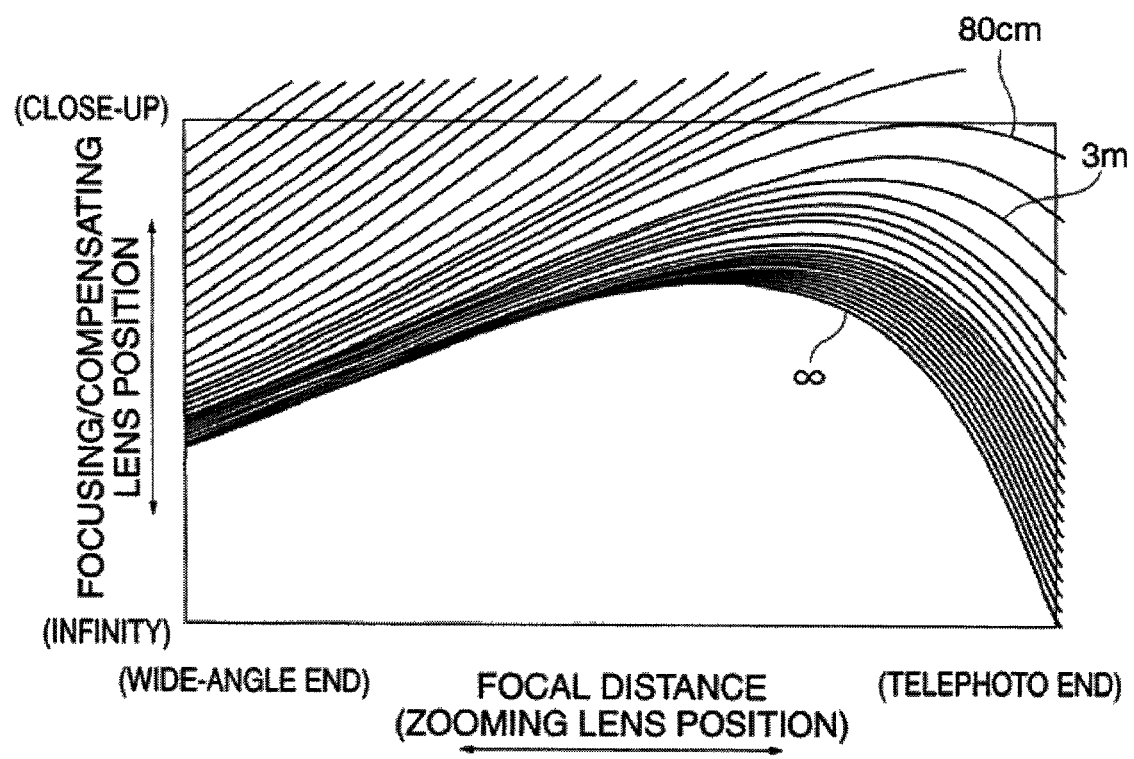
FIG. 11 is a graph showing focus loci of a focus/compensating lens during zooming.

In this way, as the shutter speed becomes slower, a larger number of exposure fields is set, and as shown in FIG. 9C, this results in a drop in the responsiveness characteristics of the focus movement amount (focusing speed) with respect to rotation of the focus ring 600. That is, the longer the exposure time, the lower the focus movement amount per unit rotation.

By virtue of this setting, according to the present embodiment, in the case where photography is carried out in a photographic mode in which shooting is carried out at a slow shutter speed so as to achieve sufficient brightness, such as when photographing a subject in low brightness conditions, it is possible to solve the conventional problem that picked-up images are displayed as intermittent images on a monitor or the like (for example, images are displayed in two frames per second when the shutter speed is 1/2 sec) and the photographer can only intermittently check change in focus occurring in response to a rotating operation of the focus ring 600 and hence the photographer activates the servo by himself/herself to focus in accordance with the display screen, resulting in repeated hunting of the focus movement, and focusing can be carried out with ease.

It should be noted that the present invention is not limited to the above first to third embodiments. For example, although in the first to third embodiments, an image pickup apparatus in which a camera and lens are integrated is used, the present invention can be applied to an interchangeable lens type image pickup apparatus that enables interchange of the lens.

Also, although in the first to third embodiments, an optical sensor is used as the rotation sensor that detects the rotation amount, etc. of the focus ring 600 during manual operation thereof, a magnetic sensor may be used. In this case, magnets that have been magnetized with a predetermined magnetizing pitch are disposed around the circumference of the focus ring 600 in place of the comb-shaped structure 602 shown in FIG. 6 and FIGS. 12A to 12D, and two-phase magnetoresistive elements (such as MR sensors) are disposed in place of the two photointerruptor elements (ring rotation sensors) 603, 604 disposed in fixed phase relation. In this case, an approximately sine wave-shaped intensity signal and an approximately cosine wave-shaped intensity signal that are output signals of the respective magnetoresistive elements are subjected to waveform shaping into two-phase pulse signals by a signal processing circuit such as a comparator, and the two-phase pulse signals are outputted, so that the rotation of the focus ring can be detected in the same way.

Compared to the comb-shaped structure 602 required when optical sensors are used, these magnetic sensors can detect the rotational state (rotational direction, rotation amount, rotational speed) of the focus ring 600 with higher accuracy.

As described above, according to the present invention, it is possible to provide an image pickup apparatus that is capable of optimizing the responsiveness of linear changes in focus to operations of the ring member without sacrificing the operability of the ring member, while using, as the ring member, a small-sized, low-cost ring member for manual operations.

It is to be understood that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of any of the above-mentioned embodiments on a computer, and the form of the program may be an object code, a program executed by an interpreter, or script data supplied to an OS.

Examples of the storage medium for supplying a program corresponding to any of the flowcharts shown in FIGS. 4, 7A, 7B, 8A and 8B described above include a RAM, an NV-RAM, a floppy (registered trademark) disk, an optical disk, a magnetic-optical disk, a CD-ROM, an MO, a CD-R, a CD-RW, a DVD (a DVD-ROM, a DVD-RAM, a DVD-RW, or a DVD+RW), a magnetic tape, a nonvolatile memory card, and a ROM. Alternatively, the program may be supplied by downloading from another computer, a database, or the like, not shown, connected to the Internet, a commercial network, a local area network, or the like.

What is claimed is:

1. An image pickup apparatus, comprising:
   a focus lens;
   an operating member for manually controlling the movement of said focus lens;
   a detection device adapted to detect an operation amount of said operating member; and
   a control device adapted to cause said focus lens, in accordance with the operation amount detected by said detection device, to move along an optical axis direction and to stop,
   wherein, when the present state of said focus lens is in a second depth of focus, which is deeper than a first depth of focus, said control device sets responsiveness to the operation amount detected by said detection device higher than when the present state of said focus lens is in the first depth of focus to keep apparent change in blurring in response to the operation amount of said operation member even.

2. The image pickup apparatus as claimed in claim 1, wherein said control device further adjusts the responsiveness in accordance with exposure time.

3. The image pickup apparatus as claimed in claim 1, wherein said control device controls the responsiveness so that the moving velocity of said focus lens, the present state of which is in the second depth of focus, is set to be faster than when the present state of said focus lens is in the first depth of focus.

4. The image pickup apparatus as claimed in claim 1, wherein said control device controls the responsiveness so that the moving amount of said focus lens, the present state of which is in the second depth of focus, is set to be larger than when the present state of said focus lens is in the first depth of focus.

5. An image pickup apparatus, comprising:
   a focus lens;
   a zoom lens;
   an operating member for manually controlling the movement of said focus lens;
   a detection device adapted to detect an operation amount of said operating member; and
   a control device adapted to cause said focus lens, in accordance with the operation amount detected by said detection device, to move along an optical axis direction and to stop,
   wherein, when the present state of said focus lens, where a depth of focus changes in accordance with a change in a focal distance and a change in an aperture, is in a second depth of focus, which is deeper than a first depth of focus, said control device sets responsiveness to the operation amount detected by said detection device higher than when the present state of said focus lens is in the first depth of focus to keep apparent change in blurring in response to the operation amount of said operation member during a manual operation of said operating member even.

6. The image pickup apparatus as claimed in claim 5, wherein said control device further adjusts the responsiveness in accordance with exposure time.

7. The image pickup apparatus as claimed in claim 5, wherein a moving speed of said focus lens is set as the responsiveness to the operation amount detected by said detecting device.

8. The image pickup apparatus as claimed in claim 5, wherein a focus movement amount of said focus lens is set as the responsiveness to the operation amount detected by said detecting device.

* * * * *